Figure 1:
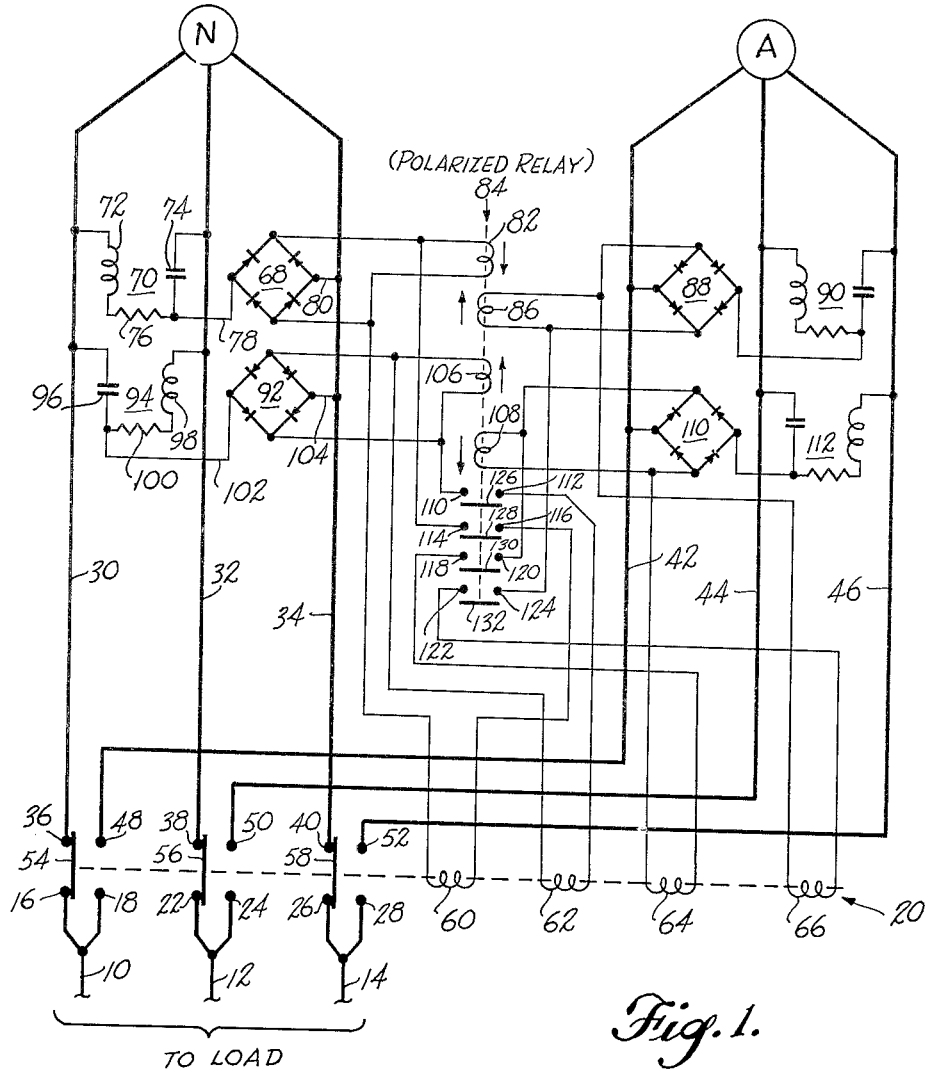

Feb. 28, 1956

R. W. STINEMAN 2,736,821

LOAD TRANSFER RELAYS

Filed June 12, 1953

2 Sheets-Sheet 1

INVENTOR.
RUSSELL W. STINEMAN
BY
Reynolds, Beach & Christensen
ATTORNEYS

INVENTOR.
RUSSELL W. STINEMAN
BY
Reynolds, Beach & Christensen
ATTORNEYS

United States Patent Office 2,736,821
Patented Feb. 28, 1956

2,736,821

LOAD TRANSFER RELAYS

Russell W. Stineman, Seattle, Wash., assignor to Boeing Airplane Company, Seattle, Wash., a corporation of Delaware Application June 12, 1953, Serial No. 361,274

12 Claims. (Cl. 307—64)

This invention relates to protective apparatus for polyphase electric power systems and more particularly concerns automatic relay means for transferring a load circuit from its normal source of power, the voltages of which have become unbalanced or otherwise abnormal, to an alternate power source then producing more nearly normal or balanced voltages.

The source referred to as the alternate power source may comprise strictly an auxiliary power source normally functioning merely for standby purposes, or it may comprise a power source which additionally serves to energize a separate load under normal system conditions, so that when a transfer is effected the alternate power source provides power to the load circuits of both power sources. Alternatively the arrangement may be such that two power sources normally energize the same load circuit and the transfer operation effected in accordance with the invention involves merely disconnecting from such load that alternator which produces abnormal or unbalanced voltages due to some fault which has occurred. The various alternative applications of the invention, which is herein illustratively described by reference to its presently prefered forms for use in normally balanced three-phase systems, will become fully obvious to those skilled in the art as the description proceeds.

Protective apparatus for a related purpose previously in use employed, in the case of three-phase power systems, three elements, such as relay coils, connected from the respective power lines to a neutral point. A material change of line-to-neutral voltage in one phase of the system was detected by the related sensing element and resulted in the transfer of the load circuit from its faulty normal power source to an alternate power source, as desired. However, without also incorporating in such apparatus three additional line-to-line sensing elements and thereby adding considerably to the expense and bulk of the protective apparatus, line-to-line voltage unbalances might go undetected since in some instances the line-to-neutral voltages would continue to be equal. A further drawback with that type of automatic load transfer apparatus is its unsuitability for those applications in which both the normal power source and the alternate power source are closely coupled for energizing the same load circuit under normal operating conditions. In a closely coupled or "stiff" system of that type any departure from normal or balanced voltages of the alternate power source, for instance, would react heavily on the normal power source due to the shortness of the interconnecting busses, and falsely actuate the load transfer apparatus so as to connect the load to the faulty alternate power source alone.

With the present invention, load transfer operation is automatically effected only when the alternate power source is instantaneously producing more nearly normal or balanced voltages than the normal power source, and this result is accomplished by relatively compact, simple and reliable apparatus for a variety of power source arrangements including those mentioned specifically at the outset. The present system detects not only line-to-neutral but also line-to-line voltage inequalities or unbalances, and effects a transfer of power sources automatically on the basis of either type of inequality or unbalance, to the end that the load shall be supplied by the best available power source should a fault occur in the load-energizing power source of sufficient degree to require the transfer.

This invention, described briefly from one aspect, comprises means for comparing the positive sequence symmetrical components or the negative sequence symmetrical components of the two power source voltages, and preferably for comparing both of these sets of components; and providing means responsive to a material unbalance in these respective sets of polyphase symmetrical components, or either of them, for automatically actuating suitable transfer switch means to remove the load circuit from the faulty power source and connect it to the other power source if the latter is not then under equal or more serious impairment.

In one embodiment described herein the sets of sequence components voltages are balanced against each other for comparison purposes by applying them to opposingly connected coils of polarized relay means arranged and operable for energizing the load transfer switch means. In a second embodiment herein described, which is regarded as the preferred embodiment, the comparison is effected by applying the respective sets of sequence components to opposingly connected coils of magnetic amplifier means for actuating load transfer switch means upon the occurrence of a material unbalance in the normal power source polyphase voltages relative to those of the alternate power source.

These and other features, objects and advantages of the invention will become more fully evident from the following description by reference to the accompanying drawings.

Figure 2:
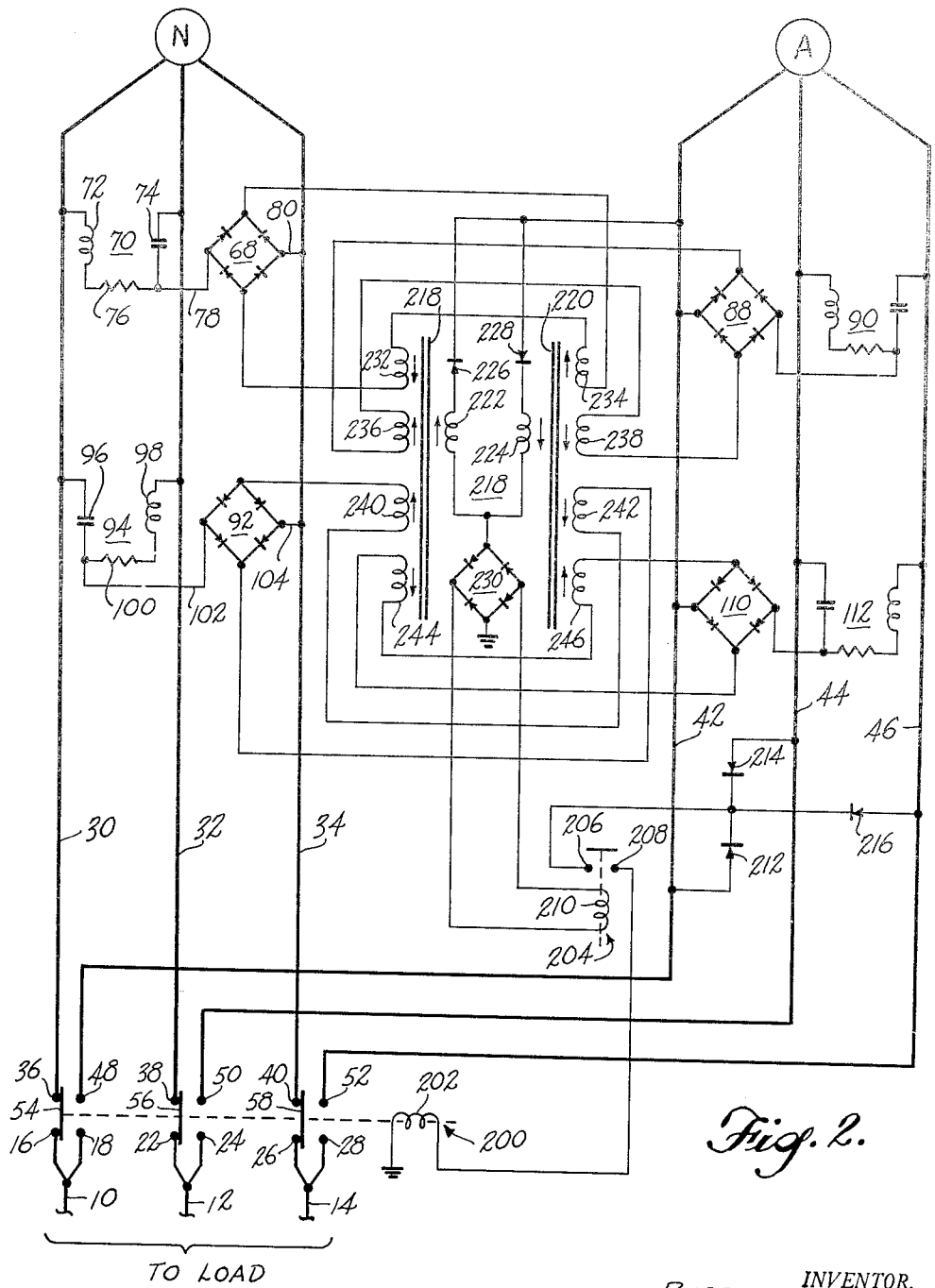

Figure 1 is a schematic diagram illustrating the embodiment mentioned first above, and Figure 2 is a schematic diagram of the preferred or second-mentioned embodiment.

Referring to Figure 1, the normal power source comprises a three-phase alternator designated N, and the alternate power source comprises a similar alternator A. The load circuit is not shown but is energized through the three-phase load busses 10, 12 and 14. Load bus 10 is connected both to a normal contact 16 and to an alternate contact 18 of load transfer switch means comprising the multiple-coil relay 20. Bus 12 is similarly connected to a separate set of relay contacts 22 and 24, while load bus 14 is similarly connected to a third set of contacts 26 and 28. The three phases of alternator N are represented by the feeder busses 30, 32 and 34 separately connected to individual relay contacts 36, 38 and 40, respectively, which in turn are paired respectively with contacts 16, 22 and 26. The three phases of alternator A are similarly represented by the feeder busses 42, 44 and 46 separately connected to individual relay contacts 48, 50 and 52, respectively, which in turn are paired respectively with contacts 18, 24 and 28. The ganged relay switch elements 54, 56 and 58 normally bridge across the three first-mentioned pairs of contacts for connecting the load busses to the normal power source N. Energization of the one or more coils of transfer switch relay 20 shifts the relay switch elements to the alternate position connecting the load to the alternate power source A. In this example the relay 20 has four operating coils, 60, 62, 64 and 66.

Positive sequence symmetrical components of the normal power source three-phase voltages are detected by means of a full-wave rectifier 68 and the positive sequence network 70 associated therewith. This well known type of network comprises an inductance 72 connected to feeder bus 30, a capacitance 74 connected to feeder bus 32 and a resistance 76 interconnecting the inductance and capacitance, these three elements being of appropriate sizes according to established theoretical considerations. The energizing conductor 78 for rectifier 68 is connected to the junction between the capacitance and resistance. The return side of rectifier 68 is connected by conductor 80 to feeder bus 34. Operating coil 82, comprising one of four such coils of a polarized relay 84, is connected across rectifier 68 for direct-current energization thereof by such rectifier. A similar operating coil 86 of this polarized relay is energized in bucking relation to coil 82 by means of a similar rectifier 88 and an associated similar positive sequence network 90. The latter are connected to the feeder busses 42, 44 and 46 of the alternate power source A in a manner corresponding to the connections of the rectifier 68 and network 70 to the normal alternator's terminals. Under normal operating conditions in the system, with the balanced, normal three-phase voltages existing across the feeder busses of normal alternator N being then substantially equal to those of alternator A, the positive sequence rectified currents in the respective opposed positive sequence sensing coils 82 and 86 balance each other out and the contacts of the polarized relay 84 remain in their initially biased, open position. The arrows indicate the directions of the forces of coils 82 and 86 on the armature of the polarized relay.

Negative sequence symmetrical components of the normal power source three-phase voltages are detected by means of a full-wave rectifier 92 and the negative sequence network 94 associated therewith. This well known type of network comprises a capacitance 96 connected to feeder bus 30, an inductance 98 connected to feeder bus 32 and a resistance 100 interconnecting the capacitance and inductance, these three elements being of appropriate sizes according to established theorertical considerations. The energizing conductor 102 for rectifier 92 is connected to the junction between the capacitance and the resistance. The return side of rectifier 92 is connected by conductor 104 to feeder bus 34. Operating coil 106 of polarized relay 84 is connected across rectifier 92 for direct-current energization thereof by such rectifier. A similar operating coil 108 of this polarized relay is energized in bucking relation to the coil 106 by means of a similar rectifier 110 and an associated similar negative sequence network 112. The latter are connected to the feeder busses 42, 44 and 46 of the alternate power source A in a manner corresponding to the connections of the rectifier 92 and network 100 to the normal alternator's terminals. Under normal operating conditions in the system, with the balanced, normal three-phase voltages existing across the feeder busses of normal alternator N being then substantially equal to those of alternator A, the negative sequence rectified currents in the respective opposed negative sequence sensing coils 106 and 108 balance each other out and the contacts of the polarized relay 84 remain in their initially biased, open position.

As a convenient means of energizing the operating coils of transfer switch relay 20, each such coil is connected to contacts of the polarized relay 84 and other contacts of the latter relay paired with the first-mentioned contacts are individually connected to the several rectifiers referred to above. Thus operating coil 60 is arranged to be energized by rectifier 80 through normally open polarized relay contacts 110 and 112; coil 62 by rectifier 104 through normally open contacts 114 and 116; coil 64 by rectifier 110 through normally open contacts 118 and 120; and coil 66 by rectifier 88 through normally open contacts 122 and 124 of the polarized relay 82. With this arrangement, of course, any operating unbalance in the polarized relay coils sufficient to actuate such relay shifts all of its ganged switch elements 126, 128, 130 and 132 for closing the four pairs of contacts simultaneously; hence all four rectifiers, to the extent of their individual energizing voltages, contribute to the resultant magnetizing force actuating the transfer relay 20.

Referring now to the operation of the protective apparatus employed in the system of Figure 1 the normal operating condition, as previously mentioned, is that shown in the figure, wherein the load-energizing normal source polyphase voltages are substantially balanced and substantially equal to those of the standby alternate source. The positive sequence rectified currents in the opposed sensing coils 82 and 86 are then substantially equal, as are the negative sequence rectified currents in opposed coils 106 and 108, and the relay contacts are open.

If now a fault occurs which materially unbalances the normal source voltages, the negative sequence rectified current in coil 106 exceeds that in coil 108; and simultaneously therewith the positive sequence rectified current in coil 82 may or may not drop below that in coil 86 depending upon the nature of the unbalance fault. These coil unbalances occur in the additive sense as indicated by the arrows, and the polarized relay contacts close, forming energizing circuits for all four operating coils of the transfer switch relay. The contacts of the latter relay are thereby reversed and the load busses 10, 12 and 14 transferred from the faulty normal source to the feeder busses 42, 44 and 46 of the alternate power source A.

In the event of a phase-balanced abnormality in the normal source voltages, as in the case of an open field winding in alternator N or a three-phase ground fault of feeder busses 30, 32 and 34, for instance, there are no negative sequence components. However, the positive sequence rectified currents in coil 82 will drop materially below those in opposed coil 86 and the polarized relay contacts will be closed. Resulting energization of transfer relay coils 60 and 66 will then transfer the load from normal source N to alternate power source A.

Thus it will be clear that the continual comparison of negative sequence components of power sources N and A provides a reliable and positive basis, utilizing compact and relatively inexpensive control means for transfer relaying in all cases of material abnormalities in the normal source voltages involving phase unbalances regardless of the cause or nature of the unbalances. On the other hand continual comparison of positive sequence components of the respective sources similarly provides a reliable and positive basis, utilizing compact and relatively inexpensive control means for transfer relaying in all cases of material abnormalities in the normal source voltages wherein no phase unbalances are involved. In some situations of unbalance the basis of transfer relaying, as previously mentioned, takes advantage of both positive and negative sequence components. It will likewise be clear that despite a fault in the normal source no transfer will be effected at all if the alternate source is simultaneously impaired by an equal or greater fault than the normal source, in terms of the respective voltage abnormalities.

Should the abnormality of the normal source voltages be very short lived no transfer will be effected assuming the sum of the finite operating periods inherent in successively actuated relays 82 and 20 is of greater duration. Selected amounts of delay in the relay operation may be incorporated in the apparatus according to well known design consideration. On the other hand should a transfer be effected, and the fault in the normal source be subsequently remedied, the polarized relay contacts will automatically reopen and the load busses transferred back to the normal power source as desired, unless either the polarized relay or transfer switch relay are of a type requiring resetting.

The degree of voltage abnormality differential between the alternators sufficient to require tripping the polarized relay 84 and effect a transfer is a matter of practical system design. Much will depend upon the voltage requirements of the load in the given system. Obviously the relay design constants selected should take these into account.

In the preferred embodiment shown in Figure 2 parts and components corresponding to similar parts and components in Figure 1 bear like reference characters. In this case the ganged switch elements of the transfer switch relay 200 are controlled by a single operating coil 202. Energization of this operating coil is under control of the auxiliary relay 204 having contacts 206 and 208. When closed by energization of the relay coil 210 these contacts complete a three-phase half-wave rectifier circuit for energizing the operating coil 200. This energizing circuit includes the three half-wave rectifiers 212, 214 and 216 respectively connected to the busses 42, 44 and 46 of alternate power source A.

Auxiliary relay 204 is normally deenergized, but is under control of a magnetic amplifier 218 responsive to abnormal or unbalanced voltages in the normal source N as determined by comparison with the voltages of alternate source A. For purposes of control sensitivity magnetic amplifier 218 is arranged for full-wave rectification, having two core sections 218 and 220 with secondary or output coils 222 and 224 wound respectively thereon. Coil 222 is energized from alternate power source bus 42 through half-wave rectifier 226 and coil 224 from the same bus through a similar rectifier 228 reversed in polarity relative to rectifier 226. The opposite terminals of coils 222 and 224 are connected to a common point on the grounded full-wave bridge rectifier 230. Being connected across the intermediate terminals of bridge rectifier 230, auxiliary relay coil 210 receives full-wave rectified current.

The primary or control coils of magnetic amplifier 218 in the present embodiment correspond to the sensing coils of the polarized relay in the preceding form. In the present case there are essentially four primary coils but because full-wave amplification is used each is made up of two coils wound on the core sections 218 and 220 and energized in series relationship. Thus the related coils 232 and 234 wound on the separate core sections are both energized by the full-wave bridge rectifier 68; coils 236 and 238 by the rectifier 88; coils 240 and 242 by the rectifier 92; and coils 244 and 246 by the rectifier 110. Polarities are such that coils 232 and 236 are mutually opposed, as are coils 240 and 244 on core section 218, whereas coils 234 and 238 are mutually opposed, as are coils 242 and 246 on the other core section. The arrows symbolize this bucking relationship of the coils.

In operation the balancing effect of the magnetic amplifier primary coils in respect to positive sequence components and negative sequence components of the normal and alternate power sources is essentially the same as in the preceding described form. If the normal source voltages are substantially equal to those of the alternate source the amplifier output current flowing in auxiliary relay coil 210 will be small or zero. When a fault occurs in the normal power source the resulting unbalance between two or four coils in each section of the magnetic amplifier produces partial saturation of the ferromagnetic core sections therein thus increasing the output currents through secondary coils 222 and 224 because of the reduced inductance of these coils. Such increase of output current further saturates the cores, resulting in additional increase of output current. The cumulative effect is a large change of output current sufficient to actuate the auxiliary relay 204 and thereby the transfer relay 200.

It will therefore be clear that the magnetic amplifier used in the illustrated combination provides a particularly sensitive, easily constructed, and relatively compact means for comparison of the respective positive and negative sequence components of the two power sources as a basis of effecting transfer operation in the system whereby the normal source when faulty is automatically replaced by the alternate source. However, it will be apparent to those skilled in the art that in lieu of the polarized relay means or the magnetic amplifier means still other comparison devices may be used for the purpose, and with like effect, although those presently described are preferred.

These and other variations may be employed without exceeding the scope of the invention.

I claim as my invention:

1. In a polyphase alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising network means connected to said normal source for detecting negative sequence symmetrical components of the normal source voltages, similar network means connected to said alternate source for detecting negative sequence symmetrical components of the alternate source voltages, sensing means responsively connected to both of said negative sequence component detecting means and operatively connected to said transfer switching means for operating said switching means automatically in response to a material increase in the detected negative sequence components of said normal source voltages above those of said alternate source voltages, network means connected to said normal source for detecting positive sequence symmetrical components of the normal source voltages, similar network means connected to said alternate source for detecting positive sequence symmetrical components of the alternate source voltages, and further sensing means cooperable with said first sensing means responsively connected to both of said positive sequence component detecting means and operatively connected to said transfer switching means for operating said switching means automatically in response to a material decrease in the detected positive sequence components of said normal source voltages below those of said alternate source voltages.

2. The combination defined in claim 1, wherein the first- and second-mentioned sensing means respectively comprise pairs of mutually opposed coils of polarized relay means, and circuit means controlled by said polarized relay means for operating said transfer switching means, said switching means comprising an electrically operated relay incorporated in said circuit means.

3. The combination defined in claim 2, wherein the network means include rectifiers connecting to the respective sensing means coils, and the relay means comprises four operating coils in additive relationship connected respectively to the four rectifiers.

4. The combination defined in claim 1, wherein the first- and second-mentioned sensing means respectively comprise pairs of mutually opposed primary coils of magnetic amplifier means having output circuit means connected for operating the transfer switching means.

5. The combination defined in claim 4, wherein the magnetic amplifier means is of the full-wave rectifying type comprising two separate core sections, secondary or output coils wound on the respective core sections, full-wave rectifier bridge means having an input terminal connected to corresponding ends of said secondary coils, and output terminals connected for operating the transfer switching means, the two coils in each of the pairs of primary coils of said magnetic amplifier means being energized in series and wound respectively on the separate core sections of said magnetic amplifier means.

6. In a polyphase alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising network means connected to said normal source for detecting negative sequence symmetrical components of the normal source voltages, similar network means connected to said alternate source for detecting negative sequence symmetrical components of alternate source voltages, and sensing means responsively connected to both of said negative sequence component detecting means and operatively connected to said transfer switching means for operating said switching means automatically in response to a material increase in the detected negative sequence components of said normal source voltages above those of said alternate source voltages.

7. The combination defined in claim 6, and means connected to the normal source for detecting positive sequence components of the normal source voltages, similar means connected to the alternate source for detecting positive sequence components of the alternate source voltages, and sensing means responsively connected to both of said positive sequence detecting means and operatively connected to the transfer switching means for operating said switching means automatically in response to a material decrease in the detected positive sequence components of said normal source voltages below those of said alternate source voltages.

8. The combination defined in claim 6, wherein the sensing means comprises a pair of mutually opposed coils of a polarized relay respectively connected to the normal source detecting means and the alternate source detecting means.

9. The combination defined in claim 6, wherein the sensing means comprises a pair of mutually opposed primary windings of a magnetic amplifier connected respectively to the normal source detecting means and alternate source detecting means, said magnetic amplifier having output circuit means operatively connected to the transfer switching means for operating the same.

10. In a polyphase alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising network means connected to said normal source for detecting positive sequence symmetrical components of the normal source voltages, similar network means connected to said alternate source for detecting positive sequence symmetrical components of the alternate source voltages, and sensing means responsively connected to both of said positive sequence component detecting means and operatively connected to said transfer switching means for operating said switching means automatically in response to a material decrease in the detected positive sequence components of said normal source voltages below those of said alternate source voltages.

11. In an alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising voltage detecting means connected to said normal source for detecting voltage of said normal source, similar voltage detecting means connected to said alternate source for detecting voltage of such alternate source, and sensing means responsively connected to both of said voltage detecting means and operatively connected to said transfer switching means for operating said switching means automatically in response to a material decrease in the detected voltage of said normal source below the detected voltage of said alternate source.

12. In a polyphase alternating current system including a normal alternating current power source, an alternate alternating current power source, load circuit means, and transfer switching means normally connecting said normal source to said load circuit means, said switching means being arranged and operable to disconnect said normal source from said load circuit means and connect said alternate source thereto, the combination comprising voltage detecting means connected to said normal source for detecting voltages from at least two phases of said normal source, similar voltage detecting means connected to said alternate source for detecting voltages from at least two phases of said alternate source, and sensing means responsively connected to both of said voltage detecting means and operatively connected to said transfer switching means for operating said switching means automatically in response to a material decrease in the detected voltage of said normal source below the detected voltage of said alternate source.

References Cited in the file of this patent

UNITED STATES PATENTS

| 2,245,342 | Hoye | June 10, 1941 |
| 2,326,070 | Schaelchlin et al. | Aug. 3, 1943 |